(12) United States Patent
Chauhan et al.

(10) Patent No.: US 11,714,745 B1
(45) Date of Patent: Aug. 1, 2023

(54) SOFTWARE TESTING IN PARALLEL WITH DIFFERENT DATABASE INSTANCES

(71) Applicant: State Farm Mutual Automobile Insurance Company, Bloomington, IL (US)

(72) Inventors: Shaktiraj Chauhan, Normal, IL (US); Nate Shepherd, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/333,739

(22) Filed: May 28, 2021

Related U.S. Application Data

(60) Provisional application No. 63/152,758, filed on Feb. 23, 2021.

(51) Int. Cl.
*G06F 9/44* (2018.01)
*G06F 11/36* (2006.01)
*G06F 16/25* (2019.01)
*G06F 9/52* (2006.01)

(52) U.S. Cl.
CPC ............ *G06F 11/3688* (2013.01); *G06F 9/52* (2013.01); *G06F 11/3692* (2013.01); *G06F 16/252* (2019.01)

(58) Field of Classification Search
CPC ...... G06F 11/3688; G06F 16/252; G06F 9/52; G06F 11/3692
See application file for complete search history.

(56) References Cited

U.S. PATENT DOCUMENTS

| | | | |
|---|---|---|---|
| 6,330,528 B1 * | 12/2001 | Huang | G06F 9/45537 703/22 |
| 8,281,187 B1 | 10/2012 | Desai et al. | |
| 8,549,522 B1 * | 10/2013 | Chatterjee | G06F 11/3672 718/102 |
| 9,009,823 B1 * | 4/2015 | Ismael | G06F 21/53 726/22 |
| 9,032,373 B1 * | 5/2015 | Gupta | G06F 11/3688 717/127 |
| 10,067,858 B2 | 9/2018 | McDonald | |
| 10,430,319 B1 | 10/2019 | Tokappa et al. | |
| 10,628,394 B1 * | 4/2020 | Gurspan | G06F 16/214 |

(Continued)

OTHER PUBLICATIONS

Haftmann et al. (Parallel Execution of Test Runs for Database Application Systems, Proceedings of the 31st VLDB Conference, dated 2005).*

(Continued)

*Primary Examiner* — Hang Pan

(74) *Attorney, Agent, or Firm* — Lee & Hayes, P.C.

(57) ABSTRACT

Test cases written to test a software application can be dynamically distributed among a set of software application instances such that different sets of test cases can execute simultaneously in parallel, thereby speeding up testing relative to executing the test cases sequentially. To avoid database conflicts that may occur when different test cases are executed in parallel, each software application instance can be associated with a different database instance. Accordingly, a first test case executing in association with a first database instance can avoid interfering with a second test case executing in association with a second database instance.

20 Claims, 5 Drawing Sheets

(56) References Cited

U.S. PATENT DOCUMENTS

| | | | |
|---|---|---|---|
| 2002/0116507 A1* | 8/2002 | Manjure | H04L 43/50 709/229 |
| 2003/0208351 A1* | 11/2003 | Hartman | G06F 11/3684 703/22 |
| 2005/0120276 A1* | 6/2005 | Kolawa | G06F 11/3624 714/38.1 |
| 2005/0251719 A1 | 11/2005 | Gerber | |
| 2007/0271483 A1 | 11/2007 | Kolawa et al. | |
| 2009/0144706 A1 | 6/2009 | Pastorelli | |
| 2009/0259699 A1* | 10/2009 | Chasman | G06F 16/273 707/999.203 |
| 2009/0307763 A1 | 12/2009 | Rawlins et al. | |
| 2010/0100871 A1 | 4/2010 | Celeskey | |
| 2011/0246540 A1 | 10/2011 | Salman et al. | |
| 2012/0023373 A1 | 1/2012 | Chen | |
| 2012/0151455 A1 | 6/2012 | Tsantilis et al. | |
| 2016/0026562 A1* | 1/2016 | Hwang | G06F 11/3688 714/38.1 |
| 2017/0109257 A1 | 4/2017 | Li | |
| 2018/0113798 A1 | 4/2018 | Johnston et al. | |
| 2018/0113799 A1 | 4/2018 | M.V. et al. | |
| 2018/0173606 A1 | 6/2018 | Malla et al. | |
| 2019/0129833 A1 | 5/2019 | Lv et al. | |
| 2019/0332523 A1 | 10/2019 | Gefen et al. | |
| 2020/0065235 A1 | 2/2020 | Li | |
| 2020/0174907 A1 | 6/2020 | Lundquist et al. | |
| 2020/0210170 A1 | 7/2020 | Johnson | |
| 2020/0310860 A1 | 10/2020 | Arumugam et al. | |
| 2020/0349062 A1* | 11/2020 | Coleman | G06F 11/3688 |
| 2021/0109848 A1 | 4/2021 | Leon | |

OTHER PUBLICATIONS

Office Action for U.S. Appl. No. 17/333,637, dated Jun. 15, 2022, Chauhan "Retrying Failed Test Cases in Software Testing Using Parallel Threads", 18 pages.

Office Action for U.S. Appl. No. 17/333,535, dated Jun. 20, 2022, Chauhan, "Software Testing in Parallel Threads With a Record-Locking Database", 6 pages.

Office Action for U.S. Appl. No. 17/333,989, dated Nov. 18, 2022, Chauhan, "Test Conflict Guard for Parallel Software Testing", 33 Pages.

DisGiuseppe, "Automatically Describing Software Faults". Proceedings of the 2013 9th Joint Meeting on the Foundations of Software Engineering, 2013, 4 pgs.

Office Action for U.S. Appl. No. 17/333,894, dated Jan. 6, 2023, Chauhan, "Parallel Software Testing Based on Annotations", 18 pages.

Office Action for U.S. Appl. No. 17/333,637, dated Dec. 20, 2022, Chauhan, "Retrying Failed Test Cases in Software Testing Using Parallel Threads", 22 Pages.

Qusef, "Recovering test-to-code traceability using slicing and textual analysis", Journal of Systems and Software 88 2014, pp. 147-168.

* cited by examiner

SOFTWARE TESTING IN PARALLEL WITH DIFFERENT DATABASE INSTANCES

RELATED APPLICATIONS

This U.S. Patent application claims priority to provisional U.S. Patent Application No. 63/152,758, entitled "SOFTWARE TESTING IN PARALLEL WITH DIFFERENT DATABASE INSTANCES," filed on Feb. 23, 2021, the entirety of which is incorporated herein by reference.

TECHNICAL FIELD

The present disclosure relates to software development, particularly with respect to using parallel threads to perform unit and integration testing in association with different database instances.

BACKGROUND

During development of a software application, software developers can prepare tests to verify that the software application operates as expected. Such tests may be associated with unit testing that tests the functionality of a relatively small piece of code, and/or integration testing that tests how multiple pieces of code interact. Because individual tests may be designed to test one or more relatively small aspects of the overall software application, software developers may create numerous tests associated with the entire software application.

Some tests associated with the software application may build on one another. For instance, a first test may create a record in a database, and a second test may be designed to further access or edit the database record created by the first test. In this situation, a developer may write code for the second test under the assumption that the first test will already have executed and created the record in the database by the time the second test executes. Accordingly, in this situation, the second test may be dependent on data created by the first test.

In some situations, when a new version of the software application is tested, it can take a relatively long period of time to execute all of the tests and verify that the new version of the software application successfully passes all of the tests. For instance, tests can be written to build on each other in a sequential order as discussed above, and running a large set of tests in a sequence can take a relatively long period of time. As a non-limiting example, tests for a software application may be written in a set of 7000 class files that each include numerous functions, and it may take up to two hours to sequentially execute all of the tests in the 7000 class files.

The time it takes to sequentially execute a large set of tests can pose challenges and introduce delays during software development, particularly in situations in which multiple developers are working on the same software application. As an example, a team of software developers may generate sixty new builds of the software application in a single day. If each build is tested using a set of 7000 class files that takes up to 120 minutes of server time to execute, the testing may take up to 7200 minutes of server time in a single day.

As another example, two developers may check out code from a main code branch and independently make changes to the code for the software application. If the first developer submits updated code for testing, it may take two hours to run a full set of test cases on the first developer's updated code. However, by the time the testing verifies that the first developer's changes have passed the full set of test cases and can be incorporated back into the main code branch, the second developer may separately have submitted different code changes for testing. The code changes made by the second developer may be incompatible with the changes made by the first developer. Accordingly, even if the second developer's changes also independently pass the full set of test cases, it may not be possible to incorporate those changes back into the main code branch due to incompatible changes already made by the first developer. If testing of the first developer's code changes had been performed more quickly, the second developer could have been made aware of the first developer's changes and accounted for them before the second developer submitted additional code changes for testing.

Accordingly, it can be desirable to run a full set of tests on updated code for a software application more quickly than described above. One possibility for speeding up the testing process is to run different tests in parallel at the same time. For example, rather than running tests within a full set of 7000 class files in sequence, the tests can be divided into smaller sets that can be run simultaneously in two or more parallel threads. Although executing the full set of tests in sequence may take up to two hours, running different subsets of the tests simultaneously in parallel threads may allow the full set of tests to complete in 30 minutes or less. Developers can thus be notified whether their code changes pass the full set of tests more quickly, and allow code changes that have passed the full set of tests to be merged into a main code branch more quickly. In addition to executing a full set of tests more quickly for a single new build of a software application, running tests in parallel threads can also reduce overall usage of server time when multiple new builds of the software application are tested. For instance, if testing each build of a software application takes up to 120 minutes when tests are executed sequentially in a single thread, it can take up to 7200 minutes of server time to test sixty different builds in a day. If running the tests in parallel reduces the testing time for each build down to 30 minutes as discussed above, testing sixty builds in a day may instead take only 1800 minutes of server time. However, although executing tests in parallel can speed up testing of a software application, in some cases the parallelization itself can cause errors and/or failed tests during testing.

For example, as discussed above, tests may be written under the assumption that the tests will build on one another in a sequential order. Code changes may pass such tests if the tests are indeed executed sequentially in the originally-intended order. However, the same code changes may not pass the same tests if the tests are executed out of order, particularly if related or dependent tests are executed out of order in different parallel threads, and attempt to access the same database instance.

As an example, multiple tests may attempt to access the same table of a database. The database may be configured to at least briefly lock the table when the table is accessed by a code element, such that the database table cannot be changed by other code elements while the table is locked. If a set of tests are run sequentially in an intended order, a first test may have finished accessing a database table, and the table can thus be unlocked, by the time a second test later attempts to access the database table. The second test may succeed in this scenario due to the unlocked database table. However, if the tests are instead run in parallel as described above, there is a chance that different tests, executing simultaneously in different parallel threads, may attempt to access the same database table of the same database instance at essentially the same time. This can cause database conflicts, table locking errors, application errors, service errors, and/or failure of one or more of the tests. For instance, if a database table is locked due to a first test accessing the database table, the table may still be locked if a second test, executing in parallel with the first test, also attempts to access the database table. The database table locking can thus cause the second test to fail, even though the second test may have succeeded if it had been executed at a different time when the database table was not locked due to another test executing in parallel.

As another example, tests may be written such that a first test creates data in a database, and a second test accesses or edits the data that the first test created. If these two tests are executed in sequence, the first test can have successfully created the data in the database by the time the second test attempts to access that data in the database. However, if the tests are instead run in parallel, there is a chance that the second test will execute in a parallel thread earlier than the first test executes in another parallel thread. Accordingly, if the second test executes earlier than the first test due to parallelization, the second test may fail because database data used in the second test has not yet been created by the first test.

The example systems and methods described herein may be directed toward mitigating or overcoming one or more of the deficiencies described above.

SUMMARY

Described herein are systems and methods for testing a software application using a set of test cases distributed among different instances of the software application that are associated with different database instances. To avoid database conflicts that may occur when different test cases executed in parallel attempt to access the same database, test cases executed in parallel can access different database instances. For example, the use of different database instances can avoid record-locking errors or table-locking errors when different test cases attempt to concurrently access the same record or table in the same database.

According to a first aspect, a computer-implemented method can include instantiating, by one or more processors of a computing device, a plurality of software application instances. Software application instances of the plurality of software application instances can be executable copies of a software application, and can be configured to execute simultaneously in parallel on the computing device. The method can also include instantiating, by the one or more processors, a plurality of database instances corresponding to the plurality of software application instances. The method can further include distributing, by the one or more processors, a plurality of test cases among a plurality of test sets, the plurality of test sets being associated with the plurality of software application instances. The method can also include executing, by the one or more processors, the plurality of test cases in parallel. Different test sets of the plurality of test sets can execute in association with different software application instances and different database instances. The method can additionally include collecting, by the one or more processors, a plurality of test results associated with the plurality of test cases, and aggregating, by the one or more processors, the plurality of test results.

According to a second aspect, a computing device can include one or more processors and memory storing computer-executable instructions that, when executed by the one or more processors, cause the one or more computing devices to perform operations. The operations can include identifying a plurality of test cases that test database interactions associated with a software application. The operations can also include instantiating, in the memory, a plurality of database instances associated with corresponding executable copies of the software application, and distributing the plurality of test cases among the corresponding executable copies of the software application. The operations can further include executing a first test set of the plurality of test cases, in association with a first executable copy of the software application and a first database instance of the plurality of database instances. The operations can also include executing a second test set of the plurality of test cases, in association with a second executable copy of the software application and a second database instance of the plurality of database instances, wherein the first test set and the second test set execute in parallel. The operations can additionally include collecting a plurality of test results associated with the plurality of test cases, and aggregating the plurality of test results.

According to a third aspect, one or more non-transitory computer-readable media can store computer-executable instructions that, when executed by one or more processors, cause the one or more processors to perform operations. The operations can include instantiating a plurality of database instances associated with a plurality of software application instances, and distributing a plurality of test cases among the plurality of software application instances. The operations can also include executing a first test set of the plurality of test cases, in association with a first software application instance and a first database instance of the plurality of database instances. The operations can further include executing a second test set of the plurality of test cases, in association with a second software application instance and a second database instance of the plurality of database instances, wherein the first test set and the second test set execute in parallel. The operations can also include collecting a plurality of test results associated with the plurality of test cases, and aggregating the plurality of test results.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
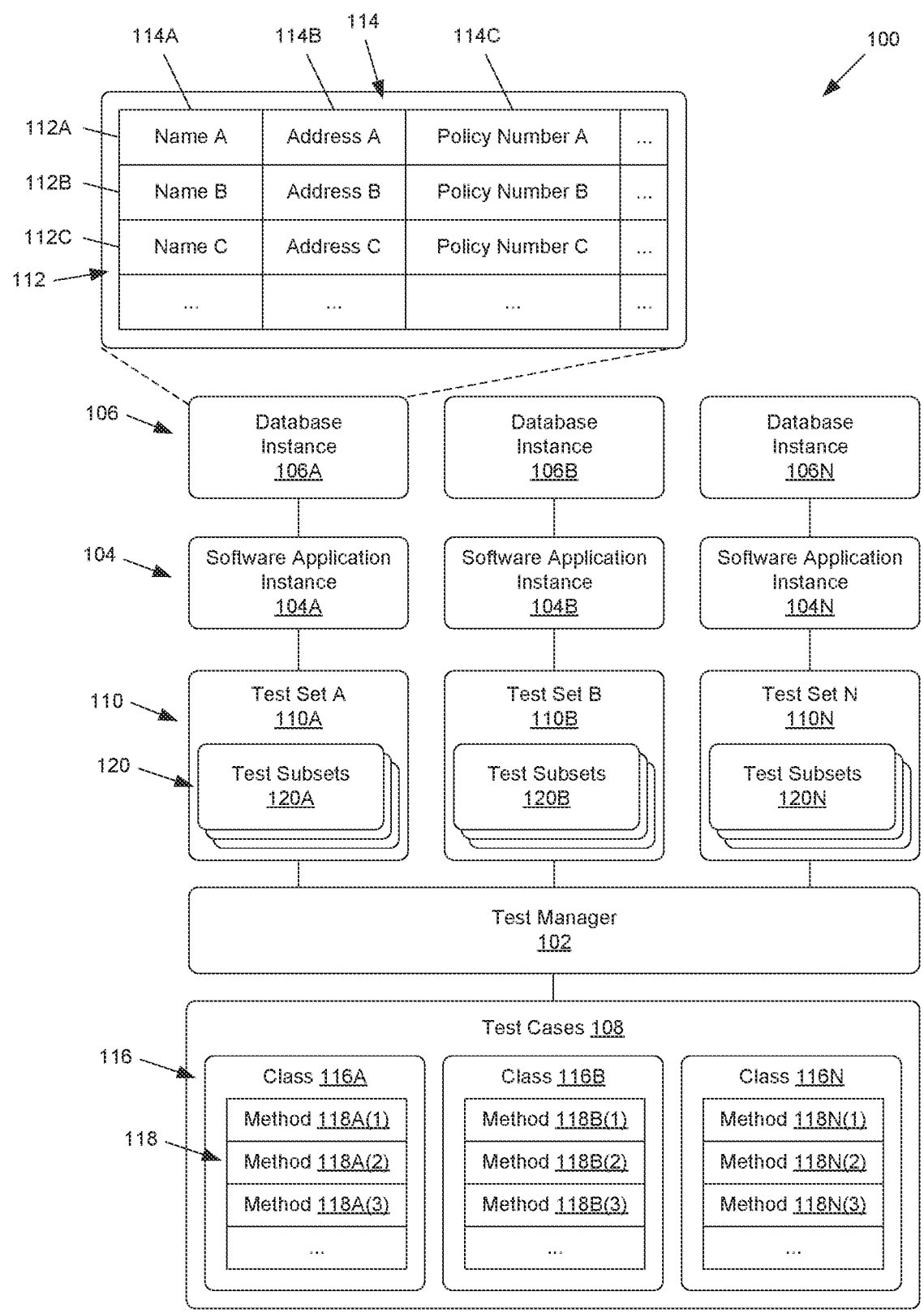
FIG. 1 shows an example of a system for testing a software application that operates in association with a database.

FIG. 1 shows an example of a system 100 for testing a software application that operates in association with a database. In particular, the system 100 can include a test manager 102 configured to generate any number of software application instances 104A, 104B, . . . 104N, etc. (referred to collectively herein as "software application instances 104"), and any number of corresponding database instances 106A, 106B, . . . 106N, etc. (referred to collectively herein as "database instances 106"). Each of the software application instances 104 can be a separate executable instance of the software application, and can be associated with a different one of the database instances 106. A computing device can execute different software application instances 104, substantially simultaneously, with respect to different corresponding database instances 106. For example, a server can use virtual machines, such as Java® virtual machines, to simultaneously run separate software application instances 104 associated with different database instances 106. In some examples, each virtual machine and corresponding software application instance may be associated with one or more parallel threads on the computing device.

The test manager 102 can also be configured to distribute code for a set of test cases 108 among different test sets 110 associated with the different software application instances 104. The test manager 102 can cause the test cases 108 in the test sets 110 to execute, substantially simultaneously, in parallel on the computing device in association with the software application instances 104. Accordingly, executing the test cases 108 in parallel can increase the speeds at which the test cases 108 can be executed, relative to executing the test cases 108 in sequence in a single thread and in association with a single instance of the software application.

The software application can be a software program comprising computer-executable instructions associated with one or more functions. As a non-limiting example, the software application can be an insurance policy management system that manages insurance policies by enabling creation, renewal, and/or termination of insurance policies associated with an insurance company, enabling users associated with the insurance company to view and/or edit information about insurance policies, and/or performing other tasks associated with management of insurance policies. In this example, information about insurance policies can be stored in a database, such that the software application can access and/or edit information about the insurance policies in the database. In other examples, the software application can be a billing and payment system, a customer management system, an order tracking system, an electronic commerce system, a database management system, or any other type of software that operates at least in part based on data stored in a database.

Each of the software application instances 104 can be a compiled and/or executable version of code for the software application written in a programming language such as Gosu®, Java®, C++, C#, Python®, or any other programming language. For instance, in examples in which code for the software application is written using Gosu® or Java®, the code can be compiled into an executable and/or deployable file, such as a web application archive (WAR) file or a Java® archive (JAR) file.

Over time, software developers can write new and/or updated code to create new and updated versions of the software application. For example, software developers may write new and/or updated code to implement new features of the software application, update or enhance existing features of the software application, update the software application to communicate with other software applications, or for any other reason. As a non-limiting example, if the software application is the insurance policy management system described above, software developers may write new code to integrate the insurance policy management system with a separate billing system, a separate customer management system, and/or other separate systems or applications.

In some examples, the system 100 can compile a new build of the software application from new or modified source code, and can make copies of the new build to generate the different software application instances 104. Accordingly, the different software application instances 104 can be associated with the same version or build of the software application. Different software instances 104 may also be considered different executors during testing, or be executed in association with different executors, scripts, or task sets during testing. For example, the test manager 102 may cause the software application instances 104 to be compiled and/or executed such that the software application instances 104 are configured to execute test cases 108 of different corresponding test sets 110 and/or other tasks during testing, as described further below. The test manager 102 may create a test environment on a computing device that can cause the different software application instances 104 to execute in parallel, for instance in different virtual machines and/or in association with different parallel threads.

As discussed above, the software application can be designed to interact with a database. Software developers can write code to test the functionality of new or existing versions of the software application, including testing interactions between the software application and the database. One or more software developers can create a set of test cases 108 for unit testing and/or integration testing of the software application. The test cases 108 can be designed to verify whether a new or existing version of the software application passes the set of test cases 108 and operates as intended by the software developers. The test cases 108 can test various scenarios regarding how the software application can interact with the database. For instance, the test cases 108 may test whether the software application can access the database, can access particular tables of the database, and/or can access particular records in the database.

In some examples, there may be a relatively large number of test cases 108 in part due to regulatory requirements, state laws, business requirements, rules, and/or other factors. For instance, when the software application is a policy management system that manages insurance policies, different states or jurisdictions may have different laws that impact how such insurance policies are to be managed. Accordingly, the set of test cases 108 can include one set of tests that attempt to verify that the software application can successfully manage insurance policies according to the rules of one jurisdiction, as well as another set of tests that attempt to verify that the software application can also successfully manage insurance policies according to the rules of another jurisdiction.

The test manager 102 can be configured to distribute the test cases 108 into different test sets 110 that are associated with different software application instances 104, such that the test cases 108 of each test set can be executed in parallel. For example, each of the test sets 110 may include a different group of test cases 108. Each of the software application instances 104 can also be associated with a different one of the database instances 106. Accordingly, different database instances 106 associated with different software application instances 104 can be used to test different test sets 110 that include different test cases 108.

Each of the database instances 106 can be a relational database, non-relational database, object-oriented database, network database, hierarchical database, a flat file or other flat structured data storage element, or any other type of database or data storage element that stores records. In some examples, each database instance may organize data into one or more tables that each have rows and columns. However, in other examples, the database instances 106 may store in other formats without the use of tables.

Each database instance can contain any number of records 112A, 112B, 112C, etc. (referred to collectively herein as "records 112") having any number of attributes 114A, 114B, 114C, etc. (referred to collectively herein as "attributes 114"). In some examples, different records 112 can be represented as different rows of a table, while different attributes 114 of the records 112 can be represented as different columns of the table. In other examples, different records 112 can be represented in a database instance without the use of rows and columns, or tables.

FIG. 1 shows a non-limiting example in which records 112 in database instance 106A, including a first record 112A, a second record 112B, and a third record 112C, are associated with insurance policies. These example records 112 can each include attributes 114, such a name attribute 114A, an address attribute 114B, a policy number attribute 114C, and/or other types of attributes 114. Other database instances 106 may include similar types of records. In other examples, records 112 and attributes 114 of database instances 106 can be associated with any other type of data, such as customer information, order information, billing information, or any other data.

Data in database instances 106 can be accessed or changed using a query language, such as the Structured Query Language (SQL), and/or other types of commands or input. For example, software application instance 104A may use SQL queries or other commands to interact with database instance 106A, to add new records 112, edit existing records 112, delete records 112, retrieve one or more attributes 114 of one or more records 112, and/or otherwise interact with database instance 106A.

In some examples, each software application instance can be tightly coupled with a corresponding database instance. For example, when software application instance 104A executes, software application instance 104A can create database instance 106A as a tightly coupled database, such that database instance 106A can store data used by software application instance 104A during execution of software application instance 104A. In other examples, software application instances 104 can be loosely coupled with corresponding database instances 106, such as database instances 106 that are initiated and/or maintained separately from the software application instances 104.

In some examples, each of the database instances 106 can be an in-memory database that stores data in random-access memory (RAM) or other volatile memory of a computing device. In other examples, each of the database instances 106 can stored in persistent memory such as hard disk drives, solid-state drives, or other non-volatile memory. In some examples, each of the database instances 106 can be an "H2mem" database, a "Postgres" database, or any other type of database.

The database instances 106 can be table-locking databases, record-locking databases, or other types of databases that do or do not use tables. A table-locking database can be configured to at least briefly lock a table of the database, including all of the records 112 of that table, when any record in the table is accessed. As a non-limiting example, each of the database instances 106 can be an "H2mem" in-memory table-locking database with an "MVStore" engine that is configured to at least briefly lock an entire database table when the table is accessed. A record-locking database can be configured to at least briefly lock individual records 112 when such records 112 are accessed, instead of locking an entire table, another data structure larger than an individual record, or the entire database. As a non-limiting example, each of the database instances 106 can be an "H2mem" in-memory record-locking database that uses Multi-Version Concurrency Control (MVCC) to set database locks at a record level.

In some examples, each of the database instances 106 can be instantiated as an in-memory database when corresponding software application instances 104 are loaded or instantiated in memory. For example, when software application instance 104A is loaded into memory by a computing device for execution, software application instance 104A may create database instance 106A as an in-memory database by defining one or more columns of one of more tables, or by otherwise instantiating the database instance 106A. Thereafter, according to test cases 108 in the test set 110A associated with software application instance 104A, software application instance 104A can add records 112 to the database instance 106A, or otherwise access database instance 106A, after the in-memory database has been instantiated. Software application instance 104B may similarly create database instance 106B, and add records 112 to database instance 106B or otherwise access database instance 106B. Other software application instances 104 can similarly create and access other corresponding database instances 106. In examples in which different software application instances 104 are associated with different virtual machines, a software application instance in a particular virtual machine can create a corresponding database instance in the same virtual machine.

Although the software application instances 104 may be copies of the same build of the software application, each of the software application instances 104 may add different data to the corresponding database instances 106, and/or edit data differently in the corresponding database instances 106. For example, different test cases 108 assigned to different software application instances 104 in different test sets 110 may cause the software application instances 104 to interact with their corresponding database instances 106 differently after the database instances 106 have been instantiated in memory.

Accordingly, different database instances 106 may store different data, including different tables, different records 112, and/or different attributes 114. As a non-limiting example, software application instance 104A may, according to a first test case, add record 112A to database instance 106A with a name attribute 114A of "John Smith." However, software application instance 104B may, according to a second test case, add a different record to database instance 106B with a name attribute of "Emily Harvey." In this example, database instance 106A and database instance 106B may hold different data based on the execution of different test cases associated with different test sets 110, such that database instance 106A does not include a record with a name attribute of "Emily Harvey" and database instance 106B does not include a record with a name attribute of "John Smith."

In some examples, different database instances 106 may be at least partially initialized to include the same types of tables and/or to store the same initial test data. However, after initialization, executing different test cases 108 of different test sets 110 in association with the different database instances 106 may cause data stored in the different database instances 106 to diverge.

Code for the test cases 108 can be expressed in one or more classes 116A, 116B, . . . 116N, etc. (referred to collectively herein as "classes 116"). Each of the classes 116 can include one or more methods 118. For example, different classes 116 can be associated with different class files, each of which includes code for one or more methods 118. Individual methods 118 can set up data in a database for tests, test functionality associated with the software application, output test results, or perform any other operation associated with testing of the software application.

Each method in a class may be a function, such as a function written in Gosu®, Java®, or another programming language. As an example, a file for a class can be a .gs file containing Gosu® code for one or more methods 118. The test cases 108 can include any number of files for classes 116, such as class 116A, class 116B, . . . and class 116N, as shown in FIG. 1. Each class file can include any number of methods 118 as shown in FIG. 1. For example, class 116A can include methods 118A(1), 118A(2), 118A(3), etc. Different class files can include the same or a different amount of methods 118.

As will be discussed further below, some of the classes 116 and/or methods 118 may be related or dependent on one another. For example, a software developer may have written a test case that depends on, or builds on, operations the developer assumed another related test case would already have performed. As another example, a test case may be designed to use or edit database data that a software developer assumed another related test case would already have created. As still another example, different test cases may be configured to access the same database data.

The test manager 102 can be an executable software component or script that is configured to manage the execution of the test cases 108, including classes 116 and/or methods 118, with respect to the software application instances 104 and corresponding database instances 106. In some examples, the test manager 102 can be associated with a build automation tool, such as Gradle®, that can build new versions of the software application, initialize an execution environment for testing the software application that includes different software application instances 104, and/or define tasks to be executed with respect to testing the software application instances 104. For example, the test manager 102 may create different Gradle® executors, or other scripts, code, configurations, or computer-executable instructions that cause different software application instances 104 to execute test cases 108 of different test sets 110 in association with different database instances 106, or that otherwise cause the different test sets 110 to be executed in association with the different software application instances 104 and corresponding different database instances 106.

The test manager 102 can be configured to distribute the test cases 108 among different test sets 110. For example, as shown in FIG. 1, the test manager 102 can distribute the test cases 108 into any number of test sets 110A, 110B, . . . 110N, etc. (referred to collectively herein as "test sets 110"). In some examples, the test manager 102 can obtain a list object, or other data, that identifies individual test cases 108. The test manager 102 can then distribute the individual test cases 108 among the different test sets 110 at a class level and/or a method level, as discussed further below.

In some examples, the test manager 102 can distribute test cases 108 to test sets 110 at a class level. In these examples, the test manager 102 can distribute all of the methods 118 of a particular class to the same test set 110, and may distribute methods 118 from other classes 116 to the same test set 110 or other test sets 110. As a non-limiting example, the test manager 102 may assign the methods 118A of class 116A to the first test set 110A, and the methods 118B of class 116B to the second test set 110B. As another non-limiting example, the test manager 102 may assign the methods 118A of class 116A, and the methods 118B of class 116B, to the first test set 110A, and assign methods of other classes 116 to other test sets 110.

In some examples, the test manager 102 can also, or alternately, distribute test cases 108 to test sets 110 at a method level. In these examples, the test manager 102 can distribute subsets of the methods 118 of the same class among different test sets 110. As a non-limiting example, the test manager 102 may assign methods 118A(1) and 118A(2) of class 116A to the first test set 110A, but assign method 118A(3) of class 116A to the second test set 110B. In some examples, the test manager 102 may also allocate subsets of methods 118 from different classes 116 to the same test set 110 when distributing test cases at a method level. As a non-limiting example, the test manager 102 may assign method 118A(3) of class 116A to the second test set 110B, and also assign method 118B(3) to the second test set 110B.

In some cases, the test manager 102 may dynamically distribute an equal number of test cases 108 to different test sets 110. In other cases, the test manager 102 may dynamically distribute an unequal number of test cases 108 to different test sets 110, for instance based on predicted execution times or other factors.

As a first non-limiting example of distributing an unequal number of test cases 108 to different test sets 110, the test manager 102 may determine that a set of five hundred methods from a first class is expected to take approximately five minutes to execute. However, the test manager 102 may determine that a second class and a third class each have only two hundred methods, and that together the four hundred methods of the second class and the third class may also take approximately five minutes to execute. Accordingly, the test manager 102 may assign the five hundred methods from a first class to a first test set, and assign the four hundred methods from the second class and the third class to a second test set. This may eliminate or reduce idle processor cycles or server time, relative to assigning each of the three classes to different test sets and waiting for the four hundred methods of the first class to complete after the two hundred methods of the second class and the third class have each completed separately in parallel.

As a second non-limiting example of distributing an unequal number of test cases 108 to different test sets 110, the test manager 102 may determine that a first subset of three hundred test cases 108 is expected to take approximately five minutes to execute, and may determine that a second subset of one thousand other test cases 108 is also expected to take approximately five minutes to execute. Accordingly, the test manager 102 may assign the first subset of the three hundred test cases 108 to a first test set, and assign the second subset of one thousand test cases 108 to a second test set, such that both test sets are expected to take approximately the same amount of time to execute despite differing numbers of test cases in the two test sets.

The test manager 102 can also be configured to cause different test sets 110 to execute simultaneously, in parallel, in association with the different software application instances 104 and the corresponding database instances 106. For example, a computing device can initiate software application instance 104A and database instance 106A, and also initiate software application instance 104B and database instance 106B. The computing device can accordingly execute a first set of methods 118 assigned to the first test set 110A in association with database instance 106A. The computing device can also, in parallel and at substantially the same time, execute a second set of methods 118 assigned to the second test set 110B in association with database instance 106B. The test manager 102 may also collect test results associated with the methods and/or classes of different test sets 110 that execute in parallel, and combine the test results into an aggregated test result report, for example as discussed below with respect to FIG. 2 and FIG. 3.

The computing device can use virtual machines, hyperthreading, parallel threads, and/or any other type of parallelization to cause the software application instances 104 to execute test cases 108 of different test sets 110 in parallel at substantially the same time. The computing device can set up and use any number of parallel threads, depending on the memory, processing power, and/or other computing resources available to the computing device. For example, the computing device can be a server that has 128 GB of memory and 16 CPUs. In this example, if each of the different software application instances 104 use approximately 15 GB of memory when executed via virtual machines in association with different database instances 106, the computing device may initialize eight parallel threads that are each allocated 16 GB of memory. The test manager 102 can accordingly associate eight software application instances 104, and eight corresponding database instances 106, with different threads of the eight parallel threads. The test manager 102 can also distribute the test cases 108 among eight test sets 110 that correspond to the eight parallel threads.

In some examples, the software application instances 104 can each be associated with a different thread of a set of parallel threads on the computing device. In these examples, each different software application instance can use a different single thread to sequentially execute methods 118 of a test set associated with the software application instance. Accordingly, although different software application instances 104 can execute in parallel at the same time, each software application instance may execute a different set of methods 118 in sequence.

In other examples, each individual software application instance can itself be associated with multiple parallel threads. For instance, each individual software application instance may execute via a different virtual machine on a computing device, but each individual virtual machine may be associated with multiple parallel threads. In these examples, the test manager 102 may further distribute test cases 108 assigned to a particular software application instance into multiple test subsets 120 associated with that particular software application instance. The particular software application instance can accordingly use different parallel threads to execute different test subsets 120, associated with the same test set, substantially simultaneously with respect to the same corresponding database instance. Other software application instances 104 may also use other sets of parallel threads to execute test subsets 120 associated with those software application instances 104 with respect to other database instances 106.

As a non-limiting example, the test manager 102 may assign a group of test cases 108 to test set 110A, which is associated with software application instance 104A. The test manager 102 can also further distribute the test cases 108 of test set 110A among multiple test subsets 120A associated with software application instance 104A. Software application instance 104A can use different parallel threads to simultaneously execute the different test subsets 120A in association with database instance 106A. The test manager 102 may also distribute test cases 108 of test set 110B into multiple test subsets 120B associated with software application instance 104B, and software application instance 104B can similarly use a different set of parallel threads to execute test subsets 120B in association with database instance 106B.

In some examples, the test manager 102 can be configured to distribute test cases 108 to test sets 110 at a class level, and to further distribute test cases 108 of a particular test set into different test subsets 120 at a class level and/or a method level. As a first non-limiting example, the test manager 102 may assign a group of twenty classes 116 to test set 110A, associated with software application instance 104A and database instance 106A. If software application instance 104A is associated with four parallel threads on a computing device, the test manager 102 can further divide methods 118 of the twenty classes 116 of test set 110A among four test subsets 120A at a class level and/or a method level. For instance, the test manager 102 may distribute entire classes 116 from test set 110A among the four test subsets 120A at a class level, or distribute individual methods 118 from the twenty classes 116 among the four test subsets 120A at a method level.

In some examples, the test manager 102 can use a Java® concurrent "ExecutorService," or other system, to initialize a fixed number of parallel threads in a thread pool in association with the software application instances 104, distribute the methods 118 of the test cases 108 among different test sets 110 and/or test subsets 120 associated with different software application instances 104, and use one or more callable objects to execute the methods 118 of the different test sets 110 and/or test subsets 120 via the parallel threads in association with the corresponding software application instances 104.

In some examples, each individual software application instance and corresponding database instance may be associated with a single one of the parallel threads in a thread pool. Each software application instance may execute test cases 108 of a corresponding test set in sequence using a single thread, in association with a corresponding database instance. In these examples, different software application instances 104 can execute simultaneously in parallel, with each software application instance executing a different test set in sequence.

In other examples, each individual software application instance and corresponding database instance may be associated with a distinct set of one or more parallel threads in a thread pool. In some cases, one or more of these individual software application instances may execute test cases 108 of a corresponding test set in sequence, in association with corresponding database instances. For example, software application instance 104A may execute test cases 108 of test set 110A in sequence via a first thread, in association with database instance 106A. However, one or more of the individual software application instances may instead execute different test subsets 120 in parallel, using different parallel threads. For example, software application instance 104B may execute different test subsets 120B of test set 110B via two or more threads associated with software application instance 104B, in association with database instance 106B. In these examples, different software application instances 104 can execute simultaneously in parallel, while each software application instance also executes different test subsets 120 in sequence and/or in parallel.

In some examples, the test manager 102 can use tasks or scripts associated with a build automation tool, such as Gradle®, to distribute the test cases 108 among test sets 110 and/or test subsets 120, and to cause execution of the test sets 110 and/or test subsets 120 in sequence or in parallel. For example, the test manager 102 can use Gradle® tasks or other scripts to dynamically set up the different software application instances 104 in different parallel threads and/or virtual machines, distribute the test cases 108 among different test sets 110 associated with the different software application instances 104, cause the methods 118 of the test sets 110 to be executed in sequence or in parallel in association with different software application instances 104 and different database instances 106, and/or to combine corresponding sets of test results into an aggregated test result report. The test manager 102 may, in some examples, also use Gradle® tasks or other scripts to distribute test cases 108 of a particular test set 110 among multiple test subsets 120, and cause the multiple test subsets 120 to execute in parallel in association with the corresponding application instance.

As a non-limiting example, if the test cases 108 contain seven thousand classes 116, the test manager 102 may divide the seven thousand classes 116, at a class level, into seven different test sets 110 that each contain methods 118 aggregated from a different set of approximately one thousand classes 116. Each of these seven test sets 110 can be associated with a different software application instance and a different database instance. The test manager 102 can cause the seven test sets 110 to be executed in parallel, substantially simultaneously, in association with the seven different software application instances 104. For instance, a first set of one thousand classes 116 may be assigned to test set 110A, and be executed in association with software application instance 104A and database instance 106A. A second set of one thousand classes 116 may be assigned to test set 110B, and be executed in association with software application instance 104B and database instance 106B at the same time the first set of one thousand classes 116 is executing in association with software application instance 104A and database instance 106A. Accordingly, the full set of seven thousand classes 116 may execute in parallel in different test sets 110 more quickly than the seven thousand classes 116 could execute in sequence in a single thread. Executing the classes 116 in parallel in different test sets 110 can also reduce server time or usages of other computing resources, relative to executing the classes 116 sequentially in a single thread.

Moreover, if individual software application instances 104 are themselves each associated with multiple parallel threads, the individual software application instances 104 may also each use different parallel threads to simultaneously execute different test subsets 120 of corresponding test sets 110. As a non-limiting example, if the test manager 102 assigns one thousand classes 116 to software application instance 104A as discussed in the example above, the test manager 102 may further distribute those thousand classes 116 into four test subsets 120A that each contain approximately two hundred and fifty classes 116. The software application instance 104A can accordingly use four different parallel threads to simultaneously execute the four test subsets 120A. Executing classes 116 of different test subsets 120 in parallel with the same software application instance, in addition to executing classes 116 of different test sets 110 in parallel with different software application instances 104, can further reduce server time or usages of other computing resources, relative to executing the classes 116 sequentially in a single thread.

Although the test manager 102 may distribute classes 116 and/or methods 118 of the test cases 108 among multiple test sets 110 and/or test subsets 120, and cause the test sets 110 and/or test subsets 120 to execute in parallel, the test cases 108 may not have been written by software developers with parallelization in mind. For example, the test cases 108 may have been written by software developers under the assumption that the classes 116 and/or methods 118, including related or dependent classes 116 and/or methods 118, would be executed sequentially in a particular intended order in a single thread. For instance, a developer may have written a test case that depends on, or builds on, operations the developer assumed another related test case would already have performed. However, because the test manager 102 may distribute test cases 108 into different test sets 110 that execute in parallel, there is a chance that the developers' assumptions about the execution order of the test cases 108 may be incorrect.

However, instantiating different database instances 106 for different software application instances 104 during testing can reduce and/or eliminate test failures or errors that might otherwise occur if testing were performed using a single database and parallelization causes test cases 108 to execute in a different order than originally intended by developers. In particular, the use of different database instances 106 may reduce or eliminate table-locking errors, record-locking errors, missing data errors, other database errors, application errors, service errors, and/or other types of errors that may otherwise cause test cases 108 to fail when executed in parallel.

A table-locking error may occur when two test cases 108 attempt to access the same table in a table-locking database concurrently, but the table becomes locked due to one of the test cases such that the other test case is prevented from accessing the table. The two test cases 108 may have been written under the assumption that, in the intended execution order, the test cases 108 would execute at different times and thus access the same table at different times such that table-locking errors would not occur. Parallelization may instead cause the two test cases 108 to execute substantially simultaneously in different parallel threads. However, although a table-locking error might otherwise occur if the two test cases 108 concurrently attempted to access the same table in the same instance of a table-locking database, such a table-locking error can be avoided by using different database instances 106A as shown in FIG. 1. For instance, the test manager 102 may assign the two test cases 108 to different test sets 110 associated with different database instances 106, such that the two test cases 108 can simultaneously access different versions of the same table in different database instances 106 without causing table-locking errors.

As an example, method 118A(1) of class 116A and method 118B(1) of class 116B may be configured to access the same database table during testing. If class 116A and class 116B were executed in parallel with respect to the same database instance, there is a risk that method 118A(1) and method 118B(1) may execute at substantially the same time in different parallel threads. This could lead to a table-locking error, such as if method 118B(1) cannot access the database table while method 118A(1) is concurrently accessing the database table. However, if class 116A and class 116B are instead assigned to different test sets 110 that correspond to different database instances 106, the risk of such a table-locking error can be reduced or eliminated. For instance, method 118A(1) may access the database table in database instance 106A, and thereby cause the database table to be at least temporarily locked in database instance 106A. At the same time, method 118B(1) may execute in a different test set 110 associated with database instance 106B. Although the database table may be locked in database instance 106A due to method 118A(1), a version of the same database table may remain unlocked in database instance 106B such that method 118B(1) can successfully access the database table. Accordingly, method 118A(1) and method 118B(1) may both succeed, and test failures due to table-locking errors can be avoided.

In some examples, the system 100 may avoid the risk of table-locking errors by instantiating the database instances 106 as record-locking databases that temporarily lock individual records of database tables instead of entire tables. However, a record-locking error may occur when two test cases 108 attempt to access the same record in a record-locking database concurrently, and the record is locked due to one of the test cases such that the other test case is prevented from accessing the record. The two test cases 108 may have been written under the assumption that, in the intended execution order, the test cases 108 would execute at different times and thus access the same record at different times, such that record-locking errors would not occur. Parallelization may instead cause the two test cases 108 to execute substantially simultaneously in different parallel threads. However, although a record-locking error might otherwise occur if the two test cases 108 concurrently attempted to access the same record in the same instance of a record-locking database, such a record-locking error can be avoided by using different database instances 106A as shown in FIG. 1. For instance, the test manager 102 may assign the two test cases 108 to different test sets 110 associated with different database instances 106, such that the two test cases 108 can simultaneously access different versions of the same record in different database instances 106 without causing record-locking errors.

Accordingly, the use of different database instances 106 can permit different methods 118 executing in different test sets 110 to concurrently access the same database table in the different database instances 106, and thereby avoid table-locking errors. Similarly, the use of different database instances 106 can permit different methods 118 executing in different test sets 110 to concurrently access copies of the same database record in different database instances 106, and thereby avoid record-locking errors.

A missing data error may occur when a test case attempts to access data in a database that does not exist. As noted above, some test cases 108 may be related to, or be dependent on, other test cases 108. Missing data errors can thus occur when a test case attempts to access data in a database that another test case has not yet created or edited. For example, developers may have written a first test case that attempts to create a particular record in a database table. The developers may also have written a second test case that attempts to access or edit that particular record. The second test case may have been written under the assumption that, by the time the second test case executes and attempts to access the particular record, the first test case will already have executed and created the particular record in the database, such that missing data errors would not occur. If parallelization instead causes the two test cases 108 to execute in different parallel threads, there is a chance that the second test case may execute in one parallel thread before the first test case executes in another parallel thread. In this situation, the second test case may fail, due to a missing data error, because the first test case has not yet created the particular record in the database. Additionally, if parallelization were to cause the two test cases 108 to execute in different parallel threads associated with different database instances 106, a missing data error may occur even if the first test case executes before the second test case, because the first test case may create the data in a first database instance instead of a second database instance, and the second test case is unable to access the data in the second database instance.

The test manager 102 can reduce or eliminate such missing data errors by assigning groups of related test cases 108 to the same test set associated with the same database instance. In some examples, the test manager 102 may distribute test cases 108 to test sets 110 at a class level. By distributing test cases 108 at a class level, methods 118 of the same class, which may be most likely to build on each other, can be assigned to the same test set and be executed with respect to the same database instance. In other examples, the test manager 102 may identify related methods and/or classes that reference the same table names, record names, attribute names, or other variable names, or that have shared annotations or other metadata, and distribute related methods and/or classes to the same test set to be executed with respect to the same database instance. In some examples, assigning related methods and/or classes to the same test set may cause methods 118 of the test set to be executed sequentially with respect to the same database instance, thereby reducing or eliminating the chances of missing data errors. In other examples, such related methods and/or classes may be executed in parallel with respect to the same database instance as part of different test subsets 120.

The test manager 102 can be configured to receive data indicating the success or failure associated with test cases 108 distributed to different test sets 110 and/or different test subsets 120. In some examples, the test manager 102 can use different universally unique identifiers (UUIDs) to track different sets of test results associated with different software application instances 104 or different database instances 106. Accordingly, the test manager 102 can track which test cases 108 fail and which test cases 108 succeed across the full set of test cases 108. The test manager 102 can collect the different sets of test results, and combine the test results into an aggregated test result report.

If a test case does fail, the test case, corresponding software application instance, or corresponding database instance may report a reason code, failure code, error code, or other data indicating why the test case failed. For instance, an error code may indicate that a test case failed due to a table-locking error, record-locking error, missing data error, other database error, application error, service error, or any other error as discussed above. Although the use of different database instances 106 may reduce or limit the occurrences of some types of errors, such as table-locking errors, record-locking errors, and missing data errors as discussed above, the test manager 102 can cause any test cases that fail due to such errors to be re-executed, as such errors may be unlikely to re-occur if the test cases are re-executed at a later point in time. Accordingly, the test manager 102 can prevent testing of the software application failing due to table-locking errors, record-locking errors, missing data errors, other database errors, application or service errors, or other errors caused by testing in parallel and not by bugs or other errors in the code of the software application.

As an example, if any table-locking errors or record-locking errors occur, the test manager 102 can track which test cases 108 fail due to table-locking errors or record-locking errors. The test manager 102 can cause re-execution of the failed test cases 108 immediately, after a period of time, or after the rest of the test cases 108 have executed. The failed test cases 108 can be likely to succeed when re-executed, as upon re-execution the test cases 108 may no longer be executing concurrently with another test case that is attempting to access the same table or record.

As another example, if any missing data errors occur because related test cases 108 execute out of sequence in different parallel threads, the test manager 102 may use test result data to identify which test cases 108 failed due to missing data errors. The test manager 102 can cause the failed test cases 108 to be re-executed at a later time, when a related test case 108 may have created the database data expected by the failed test cases 108, such that the failed test cases 108 may ultimately succeed when re-executed.

In some examples, the test manager 102 can also create multiple virtual services for the software application instances 104 on different ports at a computing device. The use of multiple virtual services on different ports can further reduce overall testing times and resolve conflicts associated with executing test cases in parallel.

Overall, the test manager 102 can reduce the time it takes to test a version of the software application by distributing test cases 108 among different test sets 110 associated with different software application instances 104 and corresponding different database instances 106. Because each different test set can be executed in association with a different software application instance and a different corresponding database instance, database errors that may otherwise occur when executing test cases 108 in parallel against a single database can be reduced and/or eliminated. In some examples, the testing time can be further reduced by causing multiple test subsets associated with a software application instance to be executed in parallel against the database instance associated with that software application instance.

Figure 2:
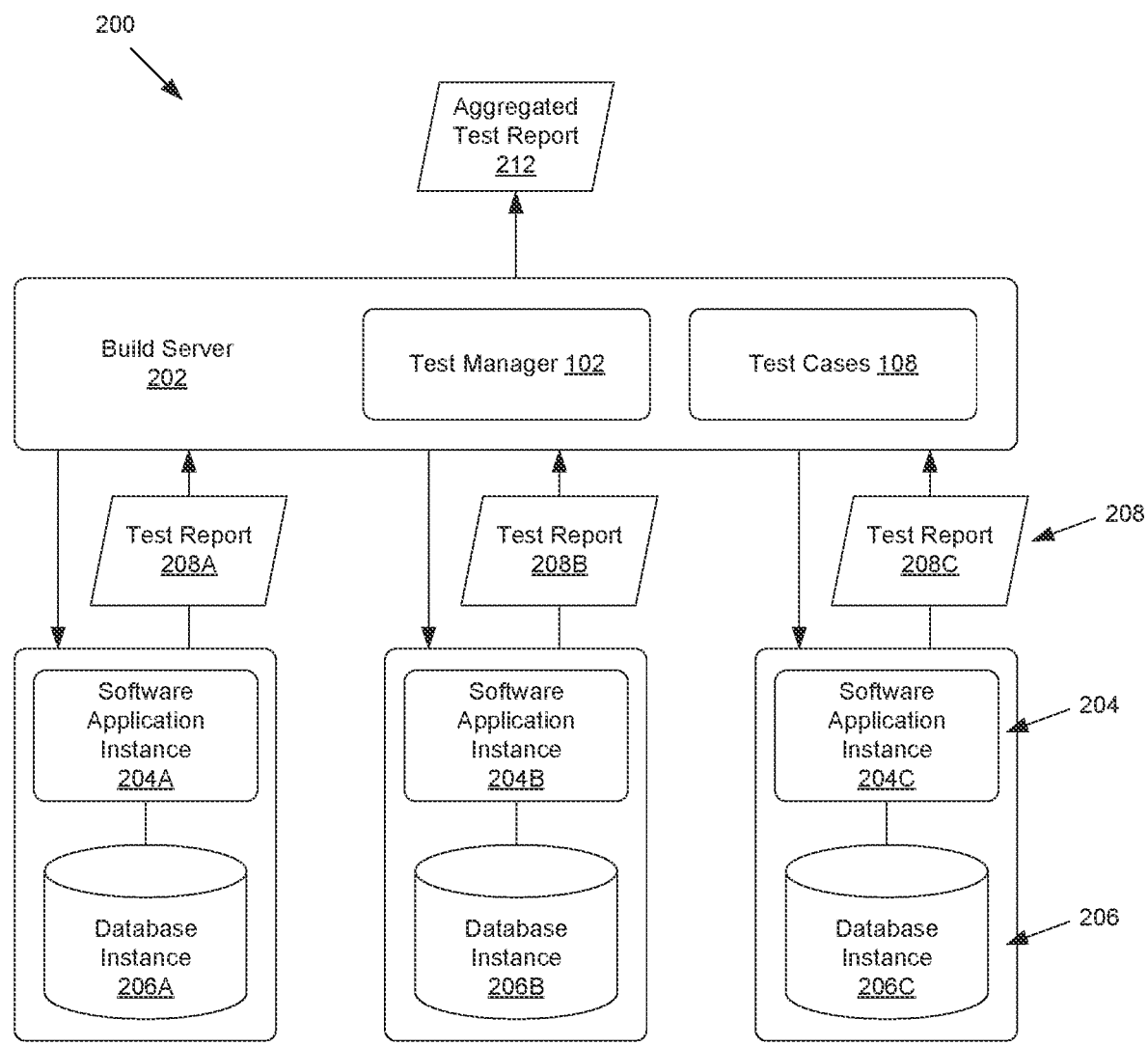
FIG. 2 shows an example of a system architecture for executing test cases in parallel in association with different software application instances and different corresponding database instances.

FIG. 2 shows an example 200 of a system architecture for executing test cases 108 in parallel in association with different software application instances and different corresponding database instances. In example 200, a build server 202 can be configured to compile a version of a software application. The build server 202, or another computing device, may also execute the test manager 102. The test manager 102 can initiate a test environment with multiple executors that are associated with different software application instances 204 of the compiled software application, such as a software application instance 204A, software application instance 204B, and software application instance 204C. For example, the test manager 102 may use the version of the software application compiled by the build server 202 to prepare software application instance 204A, software application instance 204B, and software application instance 204C for execution in different virtual machines and/or different parallel threads on the build server 202, a test server, and/or one or more other computing devices.

The software application instances 204 can each be associated with different database instances 206. For example, when software application instance 204A executes during the testing process, software application instance 204A can generate database instance 206A and execute in association with database instance 206A. Similarly, software application instance 204B can be associated with database instance 206B, and software application instance 204C can be associated with database instance 206C.

The test manager 102 can also assign different sets of test cases 108 to the different software application instances 204, and can cause the test cases 108 to be executed in association with the software application instances 204. As an example, the test manager 102 may assign a set of unit tests to software application instance 204A, a first set of integration tests to software application instance 204C, and a second set of integration tests to software application instance 204C. The executors can cause the groups of test cases 108 assigned to each of the software application instance to execute in parallel. For instance, the set of unit tests can execute in association with software application instance 204A and database instance 206A, substantially at the same time as the first set of integration tests is executing in association with software application instance 204B and database instance 206B, and the second set of integration tests is executing in association with software application instance 204C and database instance 206C. As discussed above, by executing different sets of test cases 108 in association with different database instances 206, operations of one test case executing in association with one of the database instances may not affect or conflict with operations of another test case executing concurrently in association with another one of the database instances.

Test reports 208 indicating results of the test cases 108 executed in parallel can be generated and returned to the test manager 102. For example, results of the unit tests executed in association with software application instance 204A and database instance 206A can be collected and returned to the test manager 102 in test report 208A. Similarly, results of the first set of integration tests executed in association with software application instance 204B and database instance 206B can be collected and returned to the test manager 102 in test report 208B, and results of the second set of integration tests executed in association with software application instance 204C and database instance 206C can be collected and returned to the test manager 102 in test report 208C.

Figure 3:
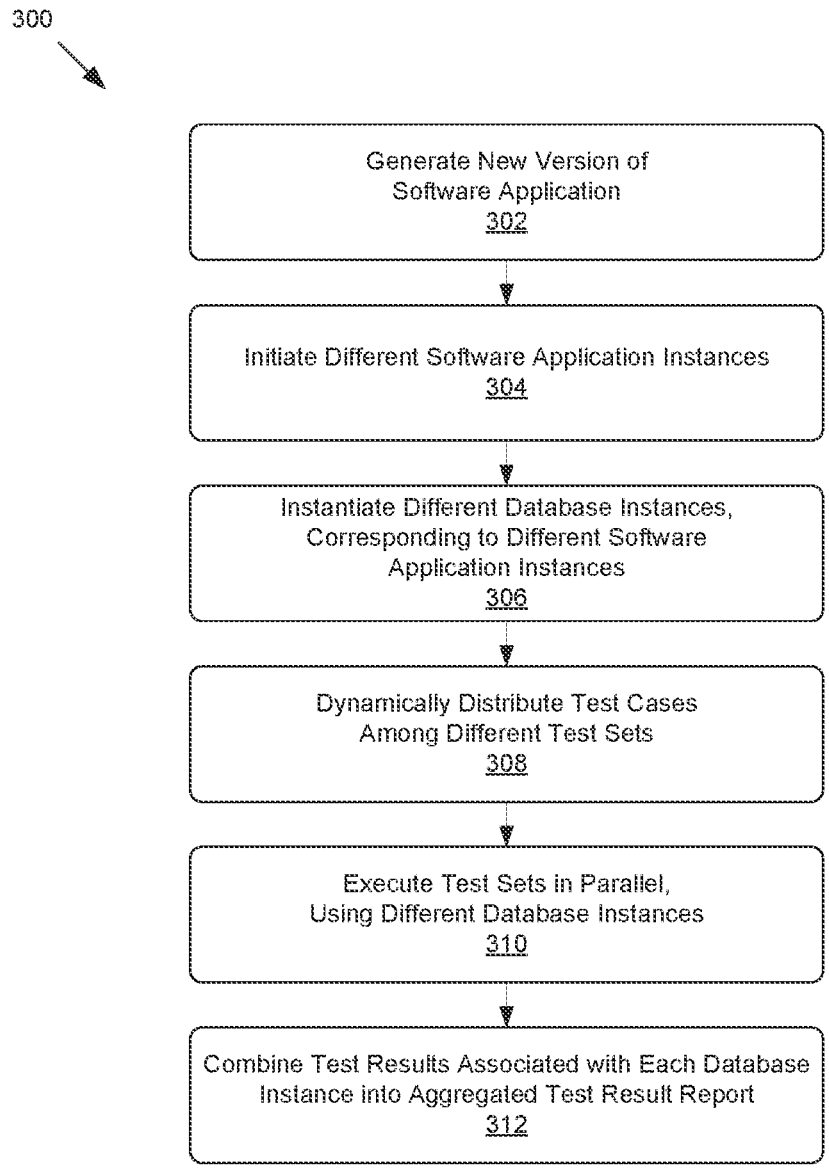
FIG. 3 shows a flowchart of a first example process for testing a software application by executing test cases in parallel using different database instances that correspond to different software application instances.

The test manager 102 can be configured to combine the test reports 208 associated with separately-executed test sets into an aggregated test report 212, as shown in FIG. 3. Accordingly, although different sets of test cases 108 were executed in different parallel threads in association with different software application instances 204 and different database instances 206, the aggregated test report 212 can indicate test results associated with the test cases 108 overall.

FIG. 3 shows a flowchart of a first example process 300 for testing a software application by executing test cases 108 in parallel using different database instances 106 that correspond to different software application instances 104. At block 302, a computing system can generate a new version of the software application. For example, a developer may have written new code, and/or changed existing code, associated with the software application. The developer can submit the new code to a compiler or code management system, such as the build server 202 shown in FIG. 2, and request that the new and/or changed code be compiled, along with unchanged code, into a new executable version of the software application. For example, at block 302 the computing system can generate a new version of the software application as a new executable and/or deployable WAR file or JAR file. In some examples, at block 302 the computing system can use tasks of a build automation tool, such as Gradle®, to build the new version of the software application.

At block 304, the computing system can initiate and/or otherwise configure different software application instances 104 to execute in parallel. For example, the test manager 102 can use Gradle® tasks, or tasks of another build automation tool, to dynamically set up an execution environment that includes different software application instances 104 associated with different virtual machines and/or parallel threads. In some examples, at block 304 the test manager 102 can use a Java® concurrent "ExecutorService" to initialize a fixed number of parallel threads in a thread pool, and assign different software application instances 104 to different sets of one or more of the parallel threads.

At block 306, the computing system can instantiate different database instances 106. Each individual database instance instantiated at block 306 can correspond to a different one of the software application instances 104 initiated at block 304. For example, at block 306 the test manager 102 can use Gradle® tasks, or tasks of another build automation tool, to instantiate the different database instances 106. As another example, the software application instances 104 can create corresponding database instances 106 when they are loaded or executed. For instance, a software application instance can be tightly coupled to a corresponding database instance, such that the software application instance creates the corresponding database instance when the software application instance executes. In some examples, the different database instances 106 can be instantiated as in-memory databases, such as table-locking databases, record-locking databases, or other types of databases.

At block 308, the computing system can dynamically distribute test cases 108 among different test sets 110. For example, at block 308 the test manager 102 can identify classes 116 in the test cases 108, and can distribute the test cases 108 among the test sets 110 at a class level. Each test set 110 can be associated with a different software application instance and a different corresponding database instance. Accordingly, at block 310, different test sets 110 can, in parallel, be executed in association with different software application instances 104 and different corresponding database instances 106. In some examples, each software application instance may execute test cases of a corresponding test set in sequence. However, in other examples, the computing system may additionally dynamically distribute test cases 108, within each test set 110, to different test subsets 120. Accordingly, at block 310, a software application instance may execute different test subsets 120 in parallel with respect to the database instance corresponding to the software application instance. The computing system may distribute test cases 108 of a test set 110 among different test subsets 120 at a class level and/or a method level.

At block 310, the computing system can cause the different software application instances 104 to, in parallel, execute different test set 110 in association with different corresponding database instances 106. For example, at block 310 the test manager 102 can use one or more callable objects to execute the methods 118 of the different test sets 110 in association with the different software application instances 104 and the different corresponding database instances 106. In examples in which each software application instance is associated with a single thread, the software application instances 104 may each execute test cases 108 of corresponding test sets 110 sequentially in the single thread associated with the software application instance. In other examples in which each software application instance is associated with multiple parallel threads, individual software application instances 104 may execute test cases 108 of different test subsets 120, in parallel, via groups of parallel threads associated with the software application instances 104. In some examples, some software application instances may execute their test sets in sequence, while other software application instances may execute their test sets in parallel using different test subsets.

Individual test cases 108 in the test sets 110 may succeed or fail at block 310, and the computing system can track test results associated with the test sets 110. For example, the computing system can maintain one or more test failure logs that include information about individual test cases 108 that fail during block 310. The test failure logs may identify failed test cases 108 and/or corresponding failure codes. For example, a failure code may indicate that a particular test case failed due to a missing data error, due to a record-locking error, due to a table-locking error, due to another database conflict error, due to an application error or service error associated with a software application instance, and/or due to any other types of errors.

In some examples, at block 310 the computing system can cause one or more test cases 108 that initially failed to be re-executed, based on the test failure logs. For example, if test failure logs indicate that a particular test case failed due to a record-locking error or a table-locking error, the computing system can cause the test case to be re-executed at block 310 because the record-locking error or a table-locking error may be unlikely to reoccur when the test case is re-executed. As another example, if test failure logs indicate that a particular test case failed due to a missing data error, the computing system can cause the test case to be re-executed at block 310 after other test cases in the same test set have completed, as the missing data error may be unlikely to reoccur when the test case is re-executed if another test case in the same test set or another test subset created the data expected by the test case in the interim.

At block 312, the computing system can aggregate results of the tests associated with the test cases 108. In some examples, the test manager 102 can receive different sets of test results associated with different test sets 110 that execute in parallel, such as test results indicating that individual test cases 108 initially succeeded or failed at block 310. The test manager 102 can also receive test results associated with test cases 108 that initially failed, but were retried at least once. If initial test results indicate that a particular test case failed initially, but succeeded after being re-executed, the computing system can disregard the initial test failure and consider the test case to have succeeded.

The test manager 102 can combine the different sets of test results into a single aggregated test result report, or otherwise aggregate the test results. The test manager 102 may output the single aggregated test result report, for instance in a format that is visible and/or usable by a user. In other examples, the test manager 102 may aggregate test results into any other format. The aggregated test results may indicate whether the new version of the software application passed all of the test cases 108 initially and/or after re-executing at least some of the test cases 108. In some examples, if the new version of the software application did not ultimately pass all of the test cases 108, the aggregated test results may identify which test cases 108 did not ultimately pass, and/or provide corresponding diagnostic details about test failures and/or errors. In some examples, after generating and/or outputting the aggregated test results, the test manager 102 may discard the different individual sets of test results that were generated in association with different software application instances and/or different database instances 106.

In some examples, at the conclusion of testing, the computing system can also de-allocate memory or other computing resources associated with the software application instances 104 and the database instances 106. For example, if server memory had been used to create eight virtual machines for eight pairs of software application instances 104 and database instances 106, the virtual machines and the corresponding software application instances 104 and database instances 106 can be terminated to clean up the server resources and prepare the server for a subsequent round of testing.

Process 300 can be used to determine whether a version of the software application passes all of the test cases 108. If the version of the software application does not pass all the test cases 108, the version of the software application can be re-coded or otherwise changed until it does pass all of the test cases 108. However, if the version of the software application does pass all the test cases 108, passing all the test cases 108 may indicate that the version of the software application is suitable to deploy in other environments, such as other testing environments, in other development environments, and/or in production environments.

In some examples, process 300 can be used for local testing of the software application based on changes made by a single developer, and/or for global testing of the software application based on changes made by multiple developers, as discussed further below with respect to FIG. 4. In both situations, by distributing test cases 108 among different test sets 110 and executing the test sets 110 in parallel, overall testing times can be reduced relative to executing the test cases 108 in sequence. Additionally, by executing different test sets 110 in parallel against different database instances 106, occurrences of database errors that might be caused by different test cases 108 executing in parallel in a different order than originally intended by developers can be reduced and/or eliminated.

Figure 4:
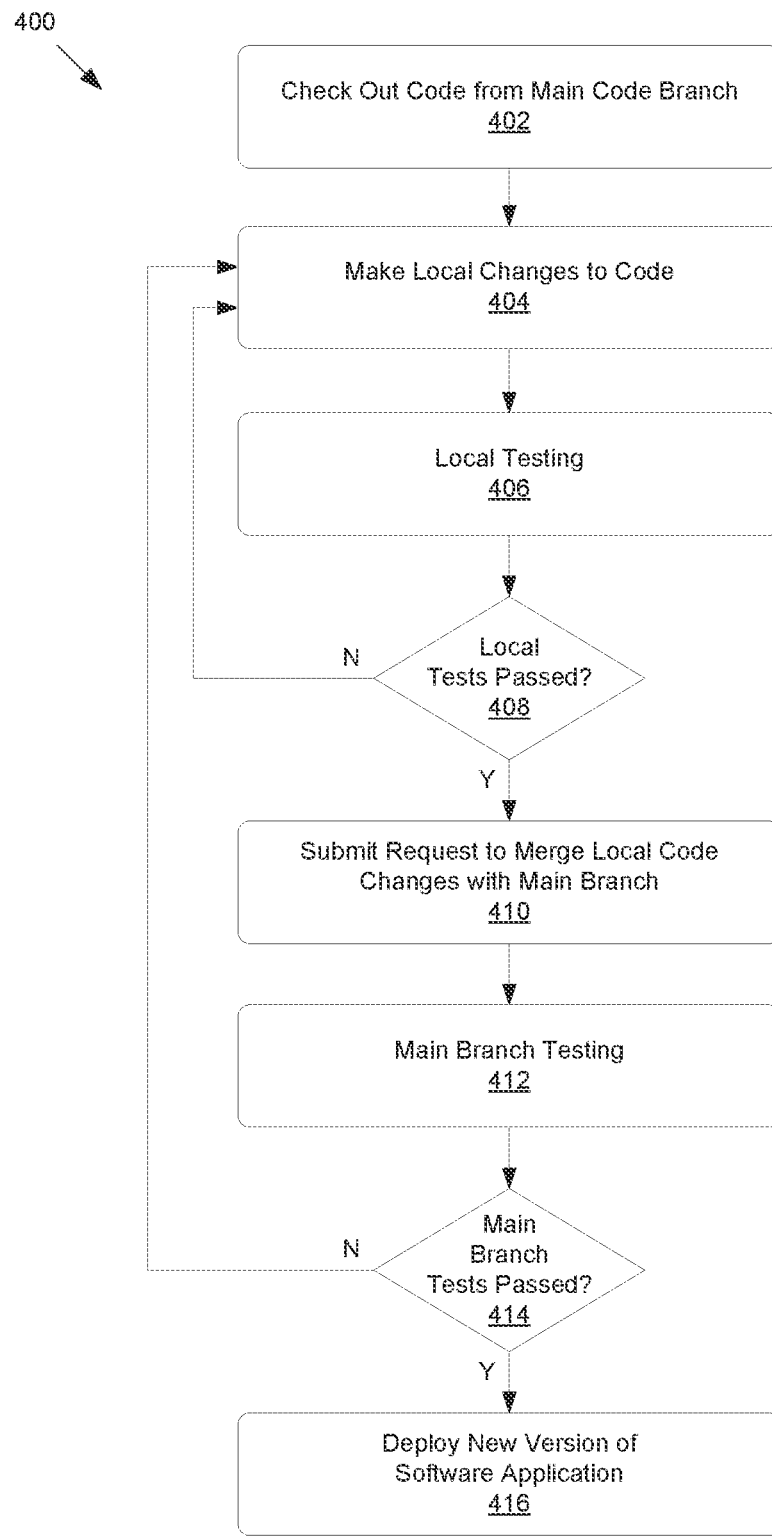
FIG. 4 shows a flowchart of a second example process for testing a software application by executing test cases in parallel using different database instances.

FIG. 4 shows a flowchart of a second example process 400 for testing a software application by executing test cases 108 in parallel using different database instances 106. At block 402, a computing device associated with a software developer can check out source code associated with the software application and/or the test cases 108 from a main code branch. The source code can be stored in a main code branch at a central repository available to a team of software developers. The computing device may receive a "check out" command from the software developer. Such a "check out" command, or other command, can cause the computing device to retrieve a copy of the source code from the central repository, and thereby check out the source code from the main code branch. Accordingly, at block 402, a computing device associated with a particular software developer can transfer a copy of the source code from the central repository and thus check out a copy of the source code from the main code branch.

At block 404, the computing device can make changes to the source code associated with the software application and/or the test cases 108 locally. The computing device can display the source code within a text editor, an integrated development environment (IDE), or other programming environment. The software developer can type new code and/or input other commends via the text editor, IDE, or other programming environment, which can cause the computing device to edit the source code checked out at block 402.

As an example, input provided by the software developer can cause the computing device to add new code or change existing code associated with the software application. As another example, input provided by the software developer can cause the computing device to add or change configuration files or other settings associated with the software application. As yet another example, input provided by the software developer can cause the computing device to add edit code for test cases 108, including adding one or more new test cases 108, removing one or more test cases 108, and/or changing source code for one or more test cases 108.

At block 406, the computing device can initiate local testing of the software application based on the local changes to the source code associated with the software application and/or the test cases 108. The local testing can include the operations of example process 300 shown and described with respect to FIG. 3. For instance, the computing device, or a separate centralized computing device, can build a new version of the software application based on local code changes associated with the software application and/or the test cases 108 made at block 404, initiate copies of the new version of the software application as different software application instances 104, create different database instances 106 associated with the different software application instances 104, distribute test cases 108 among different test sets 110 and/or test subsets 120 corresponding to different database instances 106, execute the test sets 110 in parallel in association with the different database instances 106, and output an aggregated test result report based on test results corresponding to the different database instances 106.

At block 408, the system can determine whether the new version of the software application, built and tested based on local changes to the source code, ultimately passed all of the test cases 108. If the aggregated test result report indicates that the new version of the software application did not ultimately pass all of the test cases 108 executed locally at block 406 (Block 408—No), the software developer can provide input that causes the computing device to make further changes to the source code locally at block 404, and the computing device can retry local testing at block 406. However, if the aggregated test result report indicates that the new version of the software application did ultimately pass all of the test cases 108 executed locally (Block 408—Yes), the computing device can submit a merge request at block 410. For example, based on the aggregated test result report indicating that local testing has succeeded, the software developer can input a command that causes the computing device to submit a merge request.

The merge request submitted at block 410 can be a request to combine the local code changes associated with the software application and/or the test cases 108, made at block 404, with the main code branch, such that the code changes become part of the main code branch, override previously existing code in the main code branch, and can be checked out from the main code branch by computing devices associated with other software developers. Although the local code changes may have passed local testing, the main code branch may have changed between blocks 402 and 410, for instance if other code changes made by other software developers have been merged into the main branch such that the local changes made at block 404 to code checked out from the main code branch at block 402 would conflict with more recent changes to the main code branch. To determine if the local code changes would conflict with any other changes made to the main code branch, main branch testing can be performed at block 412.

In some examples, the merge request submitted at block 410 may initiate a code review process by which one or more other software developers review the local code changes associated with the software application and/or the test cases 108 made at block 404. In these examples, if the other software developers do not approve local code changes by made by a software developer as part of the code review process, the software developer can return to make further changes to the source code locally via the computing device at block 404. However, if the other software developers do approve the local code changes as part of the code review process, the main branch testing can be performed at block 412.

The main branch testing performed at block 412 can include the operations of example process 300 shown and described with respect to FIG. 3. For instance, a centralized computing device can build a new version of the software application based on the local code changes associated with the software application and/or the test cases 108 made at block 404, as well as the most recent version of the main code branch. The centralized computing device can also initiate copies of the new version of the software application as different software application instances 104, create different database instances 106 associated with the different software application instances 104, distribute test cases 108 among different test sets 110 and/or test subsets 120 corresponding to different database instances 106, execute the test sets 110 in parallel in association with the different database instances 106, and output an aggregated test result report based on test results corresponding to the different database instances 106.

At block 414, the system can determine whether the new version of the software application, built based on a combination of the local changes to the source code associated with the software application and/or the test cases 108 and the most recent version of the source code in the main branch, ultimately passed all of the test cases 108. If the aggregated test result report indicates that the new version of the software application did not ultimately pass all of the test cases 108 executed at block 412 (Block 414—No), the software developer can provide input that causes the computing device to make further local changes to the source code at block 404. The computing device can then cause local testing to be retried at block 306 and/or cause main branch testing to be retried at block 412. However, if the aggregated test result report indicates that the new version of the software application built during main branch testing at block 412 did ultimately pass all of the test cases 108 executed at block 412 (Block 414—Yes), the new version of the software application built during block 412 can be deployed in other environments at block 416. For example, at block 416, the new version of the software application can be deployed in other testing environments, in other development environments, and/or in production environments.

Process 400 can be used to determine whether a version of software application passes all of the test cases 108 at a local level and/or when merged into a main code branch. In both situations, by distributing test cases 108 among different test sets 110 and executing the test sets 110 in parallel, overall testing times can be reduced relative to executing the test cases 108 in sequence. Additionally, by executing different test sets 110 in parallel against different database instances 106, occurrences of database errors that might be caused by different test cases 108 executing in parallel in a different order than originally intended by developers can be reduced and/or eliminated. Process 400 can be performed by a computing device associated with a single developer and/or by a central server or other computing device associated with multiple developers, an example of which is shown and described below with respect to FIG. 5.

Figure 5:
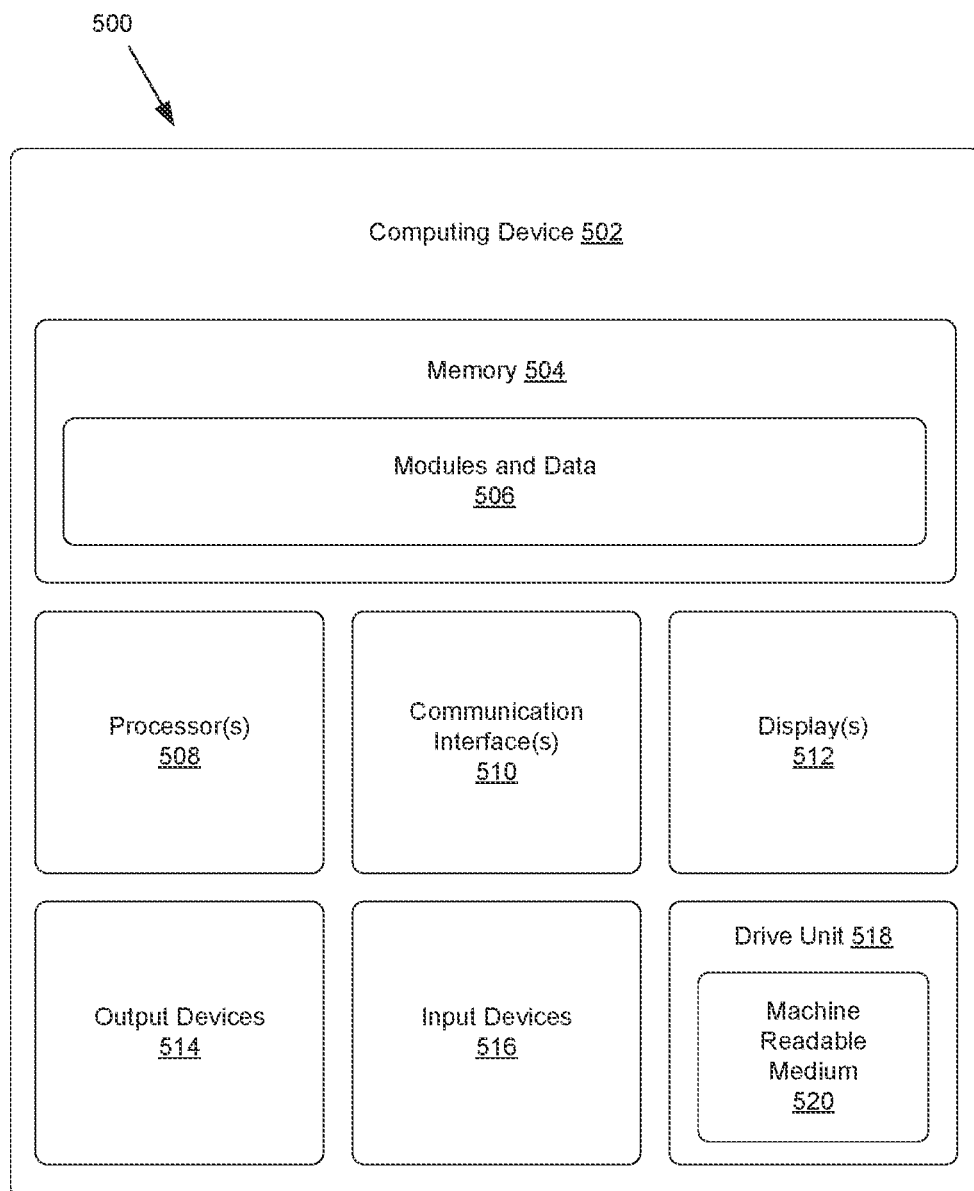
FIG. 5 shows an example system architecture for a computing device.

FIG. 5 shows an example system architecture 500 for a computing device 502 associated with the test manager 102 and/or software application described herein. The computing device 502 can be a server, computer, or other type of computing device that executes the test manager 102, and/or executes the software application instances 104 and/or test sets 110 in parallel in association with different corresponding database instances 106.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store modules and data 506. The modules and data 506 can include data associated with the test manager 102, the software application instances 104, the database instances 106, the test cases 108, the test sets 110, the test subsets 120, and/or other data. The modules and data 506 can also include any other modules and/or data that can be utilized by the computing device 502 to perform or enable performing any other actions. Such other modules and data can include a platform, operating system, and applications, and data utilized by the platform, operating system, and applications.

As discussed above, the test manager 102 may cause portions of the memory 504 to be allocated to different parallel threads and/or different virtual machines. For instance, the test manager 102 may allocate portions of an overall amount of the memory 504 to different parallel threads and/or virtual machines, and cause different pairs of software application instances 104 and database instances 106 to execute in the different parallel threads and/or virtual machines.

The computing device 502 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing device 502. The memory 504 and the processor(s) 508 also can constitute machine readable media 520.

The computing device 502 can execute testing of a software application more quickly and/or with fewer computing resources than other systems. For example, by executing the test manager 102 to distribute test cases 108 among different test sets 110 associated with different software application instances 104 and corresponding different database instances 106, the test cases 108 can be executed in parallel faster than they could be executed in sequence. As a non-limiting example, although the computing device 502 might take up to two hours to execute a full set of test cases in sequence, executing different test sets 110 simultaneously in parallel on the computing device 502 may allow the full set of test cases 108 to complete in 30 minutes or less. Developers can thus be notified whether their code changes pass the full set of test cases 108 more quickly, and allow code changes that have passed the full set of test case 108 to be merged into a main code branch more quickly.

Similarly, executing test cases 108 in parallel can also reduce overall usage of computing resources on the computing device 502 when multiple new builds of a software application are tested. As a non-limiting example, although the computing device 502 might take up to two hours to execute a full set of test cases in sequence, and thus take up to 7200 minutes to test sixty different builds in a day, reducing the testing for each build down to 30 minutes or less by executing different test sets 110 simultaneously in parallel may allow the computing device 502 to execute the full set of test cases 108 for all sixty builds in only 1800 minutes.

Moreover, because each different software application instance can execute a different test set against a different database instance, database errors that could prolong testing that may otherwise occur when executing test cases 108 in parallel against a single database can be reduced and/or eliminated. For instance, while parallelization may cause related test cases 108 to execute in different parallel threads in a different order than intended, table-locking errors, record-locking errors, missing data errors, or other database errors, which might otherwise cause test cases 108 to fail when executed in parallel with respect to the same database, can be avoided by executing different test sets 110 against different database instances 106.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   instantiating, by one or more processors of a computing device, a plurality of software application instances, wherein different software application instances of the plurality of software application instances:
      are executable copies of a software application that interacts with a database, and
      are configured to execute simultaneously in parallel on the computing device;
   instantiating, by the one or more processors, a plurality of database instances, wherein different database instances of the plurality of database instances:
      are separate instances of the database,
      correspond to the different software application instances, and
      are created as in-memory databases by the different software application instances after initiation of the different software application instances;
   dynamically distributing, by the one or more processors, a plurality of test cases among a plurality of test sets prior to execution of the plurality of test cases, wherein:
      the plurality of test cases is configured to test interactions between the software application and the database, and
      different test sets, of the plurality of test sets, correspond with the different software application instances;
   executing, by the one or more processors, the different test sets in parallel, in association with the different software application instances and the different database instances, wherein execution of the different test sets causes the different database instances to store different data;
   collecting, by the one or more processors, a plurality of test results associated with the plurality of test cases; and
   aggregating, by the one or more processors, the plurality of test results.

2. The computer-implemented method of claim 1, wherein the plurality of database instances comprises record-locking databases.

3. The computer-implemented method of claim 1, wherein:
   code of the plurality of test cases is expressed in a set of class files that each include one or more methods, and
   the one or more processors dynamically distribute the plurality of test cases, among the plurality of test sets prior to the execution of the plurality of test cases, at a class level by assigning different groups of one or more class files, of the set of class files, to the different test sets.

4. The computer-implemented method of claim 1, further comprising:
identifying, by the one or more processors, one or more failed test cases of the plurality of test cases based on execution of the different test sets in parallel; and
re-executing, by the one or more processors, the one or more failed test cases,
wherein aggregating the plurality of test results comprises determining whether all test cases in the plurality of test cases succeeded during at least one of:
execution of the different test sets in parallel, or
re-execution of the one or more failed test cases.

5. The computer-implemented method of claim 1, wherein the plurality of software application instances and the plurality of database instances are instantiated in a plurality of virtual machines executing on the computing device.

6. The computer-implemented method of claim 1, wherein the different software application instances, of the plurality of software application instances, are each associated with a different processing thread on the computing device.

7. The computer-implemented method of claim 1, wherein the different software application instances, of the plurality of software application instances, are each associated with a different set of parallel threads on the computing device.

8. The computer-implemented method of claim 7, further comprising:
distributing, by the one or more processors, a group of test cases of a particular test set among a plurality of test subsets,
wherein the particular test set and the plurality of test subsets are associated with a particular software application instance and a particular database instance; and
executing, by the one or more processors, the group of test cases in parallel, wherein different test subsets of the plurality of test subsets execute:
via different parallel threads associated with the particular software application instance, and
in association with the particular database instance.

9. The computer-implemented method of claim 1, wherein:
code of the plurality of test cases is expressed in a set of class files that each include one or more methods, and
the one or more processors distribute the plurality of test cases, among the plurality of test sets prior to execution of the plurality of test cases, at a method level by assigning different groups of methods, from across the set of class files, to the different test sets.

10. The computer-implemented method of claim 1, wherein dynamically distributing the plurality of test cases among the plurality of test sets, prior to the execution of the plurality of test cases, comprises:
determining predicted execution times associated with the plurality of test cases; and
distributing the plurality of test cases, among the plurality of test sets, based on the predicted execution times.

11. A computing device, comprising:
one or more processors;
memory storing computer-executable instructions that, when executed by the one or more processors, cause the one or more processors to perform operations comprising:
identifying a plurality of test cases that is configured to test interactions between a software application and a database;
instantiating, in the memory, a plurality of database instances, wherein different database instances of the plurality of database instances:
are separate instances of the database,
correspond with different executable copies of the software application, and
are created as in-memory databases in association with the different executable copies of the software application after initiation of the different executable copies of the software application;
dynamically distributing the plurality of test cases, among the different executable copies of the software application, prior to execution of the plurality of test cases;
executing a first test set of the plurality of test cases, in association with a first executable copy of the software application and a first database instance of the plurality of database instances;
executing a second test set of the plurality of test cases, in association with a second executable copy of the software application and a second database instance of the plurality of database instances, wherein:
the first test set and the second test set execute in parallel, and
execution of the first test set and the second test causes the first database instance and the second database instance to store different data;
collecting a plurality of test results associated with the plurality of test cases; and
aggregating the plurality of test results.

12. The computing device of claim 11, wherein the operations further comprise:
identifying one or more failed test cases of the plurality of test cases; and
re-executing the one or more failed test cases,
wherein aggregating the plurality of test results comprises determining whether all test cases in the first test set and the second test set succeeded during at least one of:
execution of the first test set and the second test set in parallel, or
re-execution of the one or more failed test cases.

13. The computing device of claim 11, wherein the operations further comprise:
creating a plurality of virtual machines on the computing device; and
associating the different executable copies of the software application with different virtual machines of the plurality of virtual machines,
wherein the different executable copies of the software application execute in parallel in the different virtual machines.

14. The computing device of claim 11, wherein the operations further comprise:
distributing individual test cases of the first test set among a plurality of test subsets associated with the first database instance; and
executing different test subsets of the plurality of test subsets via different parallel threads associated with the first executable copy of the software application and in association with the first database instance.

15. The computing device of claim 14, wherein:
code of the plurality of test cases is expressed in a set of class files that each include one or more methods,
the plurality of test cases is dynamically distributed among the different executable copies of the software application at a class level, by:
assigning one or more first class files, of the set of class files, to the first test set, and
assigning one or more second class files, of the set of class files, to the second test set, and
the individual test cases of the first test set are distributed among the plurality of test subsets at one or more of the class level or a method level, by assigning different subsets of methods of the one or more first class files among the plurality of test subsets.

16. One or more non-transitory computer-readable media storing computer-executable instructions that, when executed by one or more processors, cause the one or more processors to perform operations, comprising:
instantiating a plurality of database instances, wherein different database instances of the plurality of database instances:
are separate instances of a database,
correspond with different software application instances of a software application that interacts with the database; and
are created as in-memory databases in association with the different software application instances, after initiation of execution of the different software application instances;
dynamically distributing a plurality of test cases, configured to test interactions between the software application and the database, among the different software application instances prior to execution of the plurality of test cases;
executing a first test set, of the plurality of test cases, in association with a first software application instance and a first database instance of the plurality of database instances;
executing a second test set, of the plurality of test cases, in association with a second software application instance and a second database instance of the plurality of database instances, wherein:
the first test set and the second test set execute in parallel and
execution of the first test set and the second test set causes the first database instance and the second database instance to store different data;
collecting a plurality of test results associated with the plurality of test cases; and
aggregating the plurality of test results.

17. The one or more non-transitory computer-readable media of claim 16, wherein:
code of the plurality of test cases is expressed in a set of class files that each include one or more methods, and
the plurality of test cases is dynamically distributed, among the different software application instances prior to the execution of the plurality of test cases, at a class level by:
assigning one or more first class files, of the set of class files, to the first test set, and
assigning one or more second class files, of the set of class files, to the second test set.

18. The one or more non-transitory computer-readable media of claim 16, wherein the operations further comprise:
identifying one or more failed test cases of the plurality of test cases based on execution of the first test set and the second test set in parallel; and
re-executing the one or more failed test cases,
wherein aggregating the plurality of test results comprises determining whether all test cases in the first test set and the second test set succeeded during at least one of:
execution of the first test set and the second test set in parallel, or
re-execution of the one or more failed tests.

19. The one or more non-transitory computer-readable media of claim 16, wherein:
the first software application instance is associated with a first thread on a computing device,
the second software application instance is associated with a second thread on the computing device, and
the first test set executes in the first thread, simultaneously with the second test set executing in the second thread.

20. The one or more non-transitory computer-readable media of claim 16, wherein:
the first software application instance is associated with a first set of parallel threads on a computing device,
the second software application instance is associated with a second set of parallel threads on the computing device, and
the first test set executes in parallel in the first set of parallel threads, simultaneously with the second test set executing in parallel in the second set of parallel threads.

* * * * *